(12) United States Patent
Canzler et al.

(10) Patent No.: US 6,187,395 B1
(45) Date of Patent: Feb. 13, 2001

(54) PROCESS FOR THE PRODUCTION OF A WELD JOINT AND CONVEYING AND STORAGE CONTAINERS PRODUCED ACCORDING TO THIS PROCESS FOR BURNED OUT NUCLEAR FUEL CARTRIDGES

(75) Inventors: Hans-Jurgen Canzler; Heinz Hammer, both of Chemnitz; Reiner Laug, Hammersbach; Werner Botzem, Alzenauhorstein, all of (DE)

(73) Assignee: GNB-Gesellschaft fur Nuklear-Behalter mbH, Essen (DE)

( * ) Notice: Under 35 U.S.C. 154(b), the term of this patent shall be extended for 0 days.

(21) Appl. No.: 08/737,422

(22) PCT Filed: Jan. 24, 1995

(86) PCT No.: PCT/DE95/00090

§ 371 Date: May 1, 1997

§ 102(e) Date: May 1, 1997

(87) PCT Pub. No.: WO95/20459

PCT Pub. Date: Aug. 3, 1995

(30) Foreign Application Priority Data

Jan. 27, 1994 (DE) ................................................ 44 02 282

(51) Int. Cl.[7] ................................. B23K 33/00; G21F 5/10
(52) U.S. Cl. .......................... 428/34.1; 228/184; 376/272
(58) Field of Search ................................ 228/182, 184, 228/120; 376/272; 250/506.1, 507.1; 428/2, 34.1, 577, 583

(56) References Cited

U.S. PATENT DOCUMENTS

| | | | |
|---|---|---|---|
| 3,930,166 | * 12/1975 | Bochard | 250/506.1 |
| 4,292,528 | * 9/1981 | Shaffer et al. | 250/506.1 |
| 4,579,274 | * 4/1986 | Anspach et al. | 228/173.2 |
| 4,700,863 | * 10/1987 | Filippi et al. | 8/193 |
| 5,026,098 | * 6/1991 | Schmid | 285/148.13 |

FOREIGN PATENT DOCUMENTS

4032343A1 * 10/1990 (DE) ..................................... 376/272

* cited by examiner

Primary Examiner—Samuel M. Heinrich
(74) Attorney, Agent, or Firm—Dority & Manning

(57) ABSTRACT

The invention relates to a process for the production of a welded joint for at least three components of a multiple butt joint. In order to create the welded joint in the multiple butt-joint by welding from one side only, and to allow components to be fitted very securely to the completely covered face, the multiple butt-joint is created in such a way that at least a first and second of these components which can be welded together are positioned with a gap along their common seam; both the said components are provided with a recess in the region of the seam, said recess being bounded by both components in the direction of shrinkage at opposing surfaces; the abutting end of the third component is inserted into the recess where it fits positively; and once this jointing process is completed, the first and second components are joined by a weld seam. It is proposed that the process should be used in the production of a transport and storage container for spent nuclear fuel holders.

6 Claims, 1 Drawing Sheet

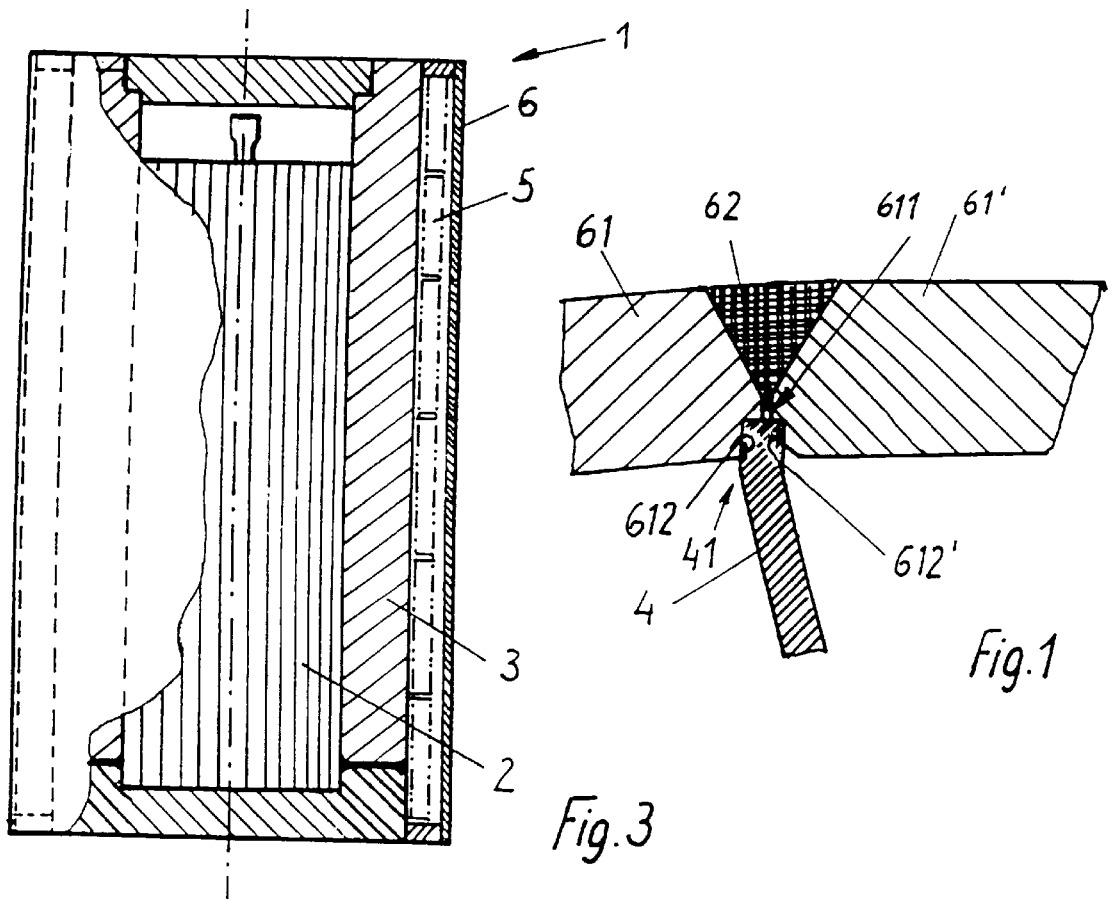
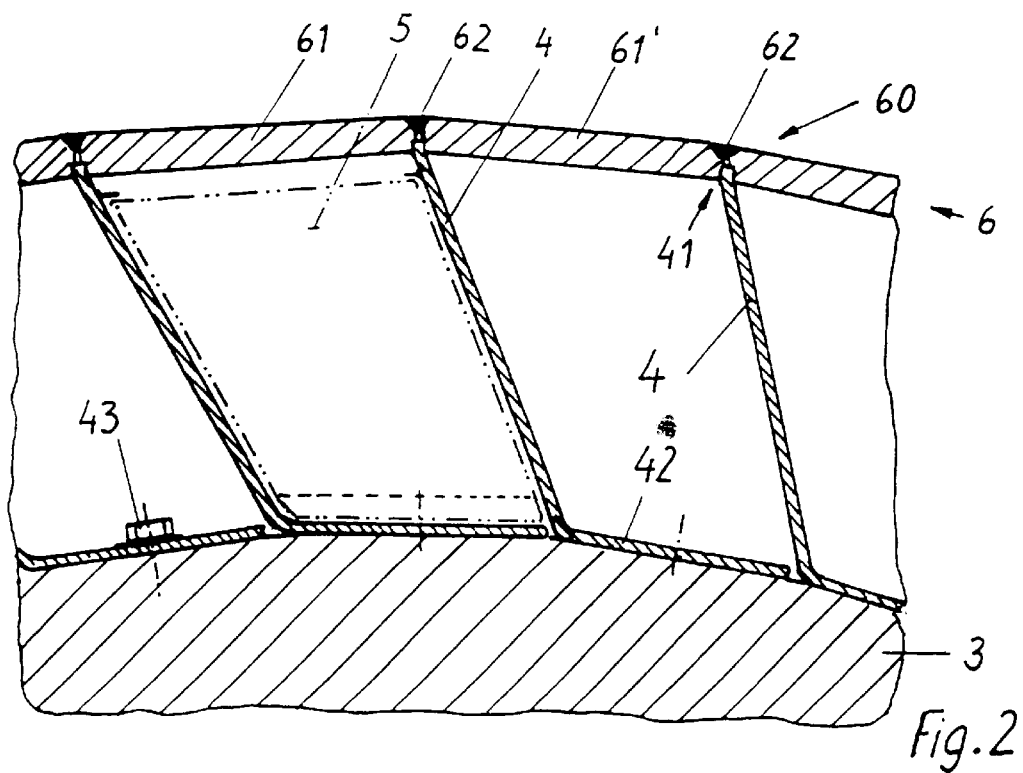

PROCESS FOR THE PRODUCTION OF A WELD JOINT AND CONVEYING AND STORAGE CONTAINERS PRODUCED ACCORDING TO THIS PROCESS FOR BURNED OUT NUCLEAR FUEL CARTRIDGES

The invention relates to a process for the production of a weld joint for at least three parts on a multiple stack, whereby parts are connected to each other via a commissure by means of a weldment.

The invention relates also to the application of said process in the manufacture of conveying and/or storage containers for burned-out nuclear fuel cassettes, consisting of a hollow cylindrical base body, ribs attached on its circumference which are radial to the cylindrical base body and a steel sleeve which encloses all of the ribs interlockingly from the outside.

In practice it is generally customary to produce a multiple stack of parts so that under the existing requirements, the parts to be connected by welding are connected to each other by several weldments which are preferably in form of fillet welds (see also Dubble, "Taschenbuch fuer Maschinenbau, $7^{th}$ edition, page G 13).

Such a process requires that the multiple stack must be accessible in the vicinity of all of its fillets for the welder or for an automatic welding device. This is a disadvantage and limits the scope of applications for such weld joints.

This process has also the disadvantage that parts of different materials cannot be welded together, or can be welded together only under considerable limitations concerning the quality.

Optical control or verification of the quality of the weldment by means of appropriate instruments is often impossible. It is not possible to use such weld joints on objects which have to meet high safety standards.

Areas of application for such weld joints are, among others, conveying and storage containers for burned-out nuclear fuel cartridges.

These nuclear fuel cartridges are provided an essentially temporary wall. A tubular base body, the first part, has protruding ribs on its outside. This base body, together with its ribs is enclosed by a sleeve, the second part. This sleeve furthermore absorbs the radiation. It protects the resin body located between the ribs and the ribs in case of accident. The sleeve assists heat removal to the outside.

Such a conveying and storage container is shown among other things in DD Patent 131 445 and in DE-PS 40 32 343. The applicant and other manufacturers use an embodiment of the connection between the sleeve and the base body in which the sleeve consists of two half cups bent to fit exactly the outer diameter of the ribs which are braced against each other and connected to the base body.

With the usual size of these containers and the necessary wall thickness of the half cups of the sleeve it is not possible to establish direct material contact between the heads of all the ribs and the inner surface of the half cups.

In any case the heat transfer from the surface of the ribs to the sleeve is hindered considerably.

On the other hand, the missing material connection between the heads of the ribs and the sleeve results in a loss of strength which may have considerable and dangerous repercussions in case of accident.

In order to avoid these disadvantages it has been proposed in DE-P"40 32 343 to make the outer sleeve of individual segments. Each of these segments covers the space between two adjoining rib heads. The segments were welded to each other and to the heads of the ribs in form of multiple stack.

For further protection of the unreliably protecting weldment, angle profiles were added to the multiple stack and these covered the weldment on the multiple stack in addition.

The large number of weldments of considerable length and the great number of parts to be connected to each other resulted in high costs which were out of proportion with the effect obtained.

The tensions in the elements to be connected which were produced by welding were also disadvantageous.

The high requirements of heat elimination make it advisable to make the ribs on the base body of copper, for example. Copper is a superior heat conductor.

When using this material for example for the ribs, additional difficulties for which there are practically no solutions are produced in the production of the weldment.

DD 228 924 proposes a solution by which the additional outer sleeve for conveying and storage containers is dispensed with. This embodiment requires however a very thick-walled base body. The ribs are unprotected. No protected space for additional screening of radiation by the resin body is provided.

DE-PS 33 06 940 proposed that ribs be provided also on the inside of the sleeve to enter the intervals between the ribs on the base body.

This embodiment requires that the outer wall of the conveying container be formed by surfaces which make it possible to fit the ribs into each other during assembly.

It is furthermore a disadvantage that no or only very limited material contact exists between the ribs of the base body and the sleeve. Heat elimination to the outside and strength of such a container are insufficient.

The normally required quadrantal configuration of the conveying container has considerable disadvantages with respect to its strength in case of accident.

This leads to the object of the invention, consisting in proposing a weld joint which makes it possible to ensure a connection that can be produced efficiently, in particular on conveying containers for nuclear fuels which must meet the highest safety requirements and which consistent material contact between the parts of the weld joint, making it also possible to connect different materials on the multiple stack to each other, possess great strength in the connection of the multiple stack and I. can be welded from one side of the multiple stack connection.

This object is attained by the invention through the process steps defined in claim 1.

In this process the third part interlockingly inserted between the parts to be welded together is wedged in with such force by the shrinking forces of the weld joint and by the relatively high temperature that may occur in the plastic zone, so that a nearly material connection between the first and the third as well as between the second and the third part is ensured.

The strength of the connection between the first and the second part is ensured by the weldment itself. Occurring tensions do not affect this.

In this process the tensions within this connection are distributed and equalized.

These characteristics of the weld joint are also eminently suited for the production of the steel sleeve on conveying and/or storage containers for burned-out nuclear fuel cartridges.

The sleeve is composed of individual strips of which two strips in pairs are joined together into a multiple stack in the vicinity of a rib and are welded together according to the described process.

Because of their limited weight the individual strips are relatively easy to handle, can be placed with great precision with their inner shoulders of the recess on the ribs and can be connected in a known manner, manually or by means of automatic welding devices from the outside with one single weldment. The resin blocks can be installed before welding. Thereby possible cavities can be filled optimally and excellent protection from radiation is ensured. The thickness of the sleeve can be practically as desired, because a precise, coordinated bending of the sleeve over a great length is no longer necessary.

Optimal heat conduction to the outer surface of the sleeve is ensured by the almost material connection between the copper ribs and the steel sleeve. The above-mentioned connection also considerably increases the resistance of the conveying container to external mechanical influences of any kind and also meets the highest safety requirements.

The weldment itself can be controlled and if necessary retrofitted by the person controlling the welding process as well as by means of known inspection devices.

The error quotient in the manufacture of this extremely cost-intensive conveying container is furthermore significantly reduced.

The invention is explained in further detail below through an example of an embodiment. The appertaining drawings show the following:

FIG. 1 a cross-section through a multiple stack connection according to the invention.

FIG. 2 a cross section through the border zone of a conveying container with ribs and sleeve and FIG. 3 a complete view of a conveying container.

The invention shall be described through the example of a conveying container for burned-out nuclear fuel cartridges or for nuclear fuel rods.

The multiple stack of parts (61, 5', 4) is formed in this case by a first strip (61) (first part) and a second strip 61' (second part) directly adjoining each other, and by the head segment 41 of a rib 4 (third part).

The rib 4 consists of a copper profile with an evenly formed head segment 41. Each of the strips 61, 61' is provided at the ends facing each other a step or shoulder-shaped recess 612, 612' which surround the head segment 41 of the rib 4 together and interlockingly. If these step-shaped recesses are pressed against the lateral surfaces of the rib 4, a commissure 611 of approximately 1 mm remains between the edges facing each other, above the shoulders of the recesses.

In the area above this commissure 611 these strips 61,61' are prepared for the ensuing welding process by applicable phases.

The weldment 62 is built up in layers, starting at the commissure 611 and going up, and thus the connection between the two adjoining strips 61, 61' is established. The head segment 41 of the rib 4 is not melted on in this process.

The shrinking forces occurring during the welding process pull the strips 61, 61' which are connected to each other with such force that the head segment 41 of rib 4 is connected almost materially with the interlockingly applied steps (612, 612') of strips 61, 62.

The relatively strong shrinking forces and the high heat production during welding ensure that the surface of the softer copper rib is plastically deformed under the pressure and all surfaces are fitted into each other in their complete structure.

This type of connection makes it unnecessary to weld different materials together.

The material selection for the third part (4) is optional within limits. The decisive factor for the selection of material is the requirement that it must maintain its shape under welding conditions and must be able to offer sufficient resistance to the shrinking forces. The connection obtained is very strong and breakage due to fissure initiators with notch effect is excluded entirely.

The heat released by the nuclear fuel cartridges 2 can be transferred very well from the copper rib 4 via the connection point into the sleeve 6 and can be released into the atmosphere. The temperature in the conveying and storage container 1 is kept within admissible limits.

The conveying and storage container 1 of which a detail is shown in FIG. 2 and which is shown entirely in FIG. 3 can be produced with considerably improved characteristics through the application of the process according to the invention.

The ribs 4 are attached to the circumference of the cylindrical base body 3 by means of screw connection 43. The threaded bores required for this are not very deep and hold the ribs 4 on the surface of base bode 3 with sufficient strength.

Resin blocks 5 which screen a substantial portion of the neutron radiation are inserted between the ribs extending along the surface lines of the base body 3. These resin blocks 5 are inserted with little clearance from the outside and are attached at a distance from the upper edge of ribs 4.

The strips 61, 61' of which the sleeve 6 is composed constitute the upper closure of the cavities.

The form of the strips has already been described through FIG. 1. The strips 61, 61' are secured in place before the beginning of the welding operation by attaching removable holding elements, so that a high degree of precision of the weldment 62 is made possible.

The strip 61 which is still free at one end can be aligned by means of the removable holding elements with the edge delimiting the commissure of the next weldment by using pre-stress against the head 41 of the ribs 4 at that location. The angular shrinking of the weldment 62 causes the still free end of the strip 61 to be lifted and the head of the rib now rests under pre-stress on the shoulder of recess 612.

In this manner the positioning into place of the parts in preparation of welding is simplified considerably and the occurrence of tensions is substantially reduced.

The form of the ribs 4 is not limited to the profile shown in FIG. 2. It is important that the surfaces of the steps in the area of the multiple stack connection 60 be selected so that the high shrinking forces are diverted into the interior of the cross-section of strips 61, 61'.

The ribs 4 can also be formed by two copper profiles facing each other in a laterally inversed manner whereby their upper outer ends are inserted together between the steps of two adjoining strips 61, 61' into a common multiple-stack connection 60. K The form of the ribs 4 depends mainly on the requirements made for the container itself. If it is to attenuate strong mechanical impact, then ribs angled to one side are advisable.

If great rigidity of the sleeve is desired, then ribs 4 oriented against each other should be used.

The sleeve itself is self-supporting after connecting all the strips and imparts great strength to the conveying container.

List of the Reference Numbers Used

1 Conveying and storage container
2 Nuclear fuel cartridges
3 Base body
4 Ribs (Profile)

41 Head
42 Foot
43 Screw connection
5 Resin block
6 Sleeve
60 Multiple stack connection
61,61' Strips
611 Commissure
612,162' Recess
62 Weldment

What is claimed is:

1. Process for the production of a weld joint for at least three parts on a multiple stack, whereby parts are connected via a seam by means of a weldment, characterized in that at least a first and a second of these parts are welded together and are positioned along their seam at a distance from each other that is greater than the absolute magnitude of a shrinkage caused by the welding bead, in that in the area of the seam these two parts are provided with a recess which is delimited by the two parts in the direction of shrinkage on surfaces facing each other, in that an abutting end of the third part is introduced interlockingly into the recess defined by the two parts and in that the first and the second part are connected by means of a weldment upon completion of this joining process.

2. A process of producing a welded joint comprising: supplying a first part and a second part, the first and second part each defining a recess;

placing the recess of the first part adjacent an abutting end of a third part;

placing the recess of the second part adjacent the abutting end of the third part, the first part and the second part further defining a seam therebetween;

welding the first part and the second part along the seam and thereby establishing shrinking forces which interlocks the abutting end of the third part within the recess of the first part and the recess of the second part.

3. A process for producing a conveying and/or storage container for spent nuclear fuel cartridges comprising: providing a hollow, cylindrical base body having a plurality of ribs attached to the circumference of the base body and oriented nearly radially relative to the cylindrical base body;

providing a steel sleeve which encloses all the ribs interlockedly from the outside, wherein the sleeve is composed of a plurality of individual strips parallel to the axis of the base body and a pair of welded strips which bridge the body between two adjoining ribs and form a multiple stacked connection over the head of each rib.

4. A conveying and storage container for burned-out nuclear fuel cartridges manufactured according to the process as in claim 3 characterized in that the ribs placed on the base body consist of angle profiles and that the ribs are attached on a circumference of the base body by means of screw connections and in that the head area of all the ribs adjoining strips are connected to each other by a weldment and that the heads of the ribs are interlockedly held between the pressed together shoulders of a recess defined by the two strips adjoining each other.

5. The process according to claim 3 wherein said plurality of ribs are constructed of copper.

6. The process according to claim 5 wherein the abutting of the third part within the recess plastically deforms the third part under the pressure of the shrinking forces.

* * * * *

UNITED STATES PATENT AND TRADEMARK OFFICE
Certificate

Patent No. 6,187,395 B1                                    Patented: February 13, 2001

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Hans-Jurgen Canzler, Chemnitz, Germany; Heinz Hammer, Chemnitz, Germany; Reiner Laug, Hammersbach, Germany; Werner Botzem, Alzenauhorstein, Germany; André Lemogne, Chemnitz, Germany; and Marc Buonomo, Chemnitz, Germany.

Signed and Sealed this Tenth Day of December 2002.

TOM DUNN
*Supervisory Patent Examiner*
Art Unit 1725